(12) United States Patent
Moerbe

(10) Patent No.: US 6,353,314 B1
(45) Date of Patent: Mar. 5, 2002

(54) TRAVEL SENSOR FOR DETECTING TRAVEL VALUE OR TRAVEL CHANGE OF MECHANICAL COMPONENT

(75) Inventor: Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,701
(22) PCT Filed: Apr. 7, 1998
(86) PCT No.: PCT/DE98/00976
  § 371 Date: Dec. 9, 1999
  § 102(e) Date: Dec. 9, 1999
(87) PCT Pub. No.: WO98/57128
  PCT Pub. Date: Dec. 17, 1998

(30) Foreign Application Priority Data

Jun. 10, 1997 (DE) .......................... 197 24 387

(51) Int. Cl.$^7$ ............ G01B 7/30; G01B 7/14; G01D 5/02; G01D 5/12
(52) U.S. Cl. .............. 324/207.22; 324/207.2; 324/207.21; 324/207.23; 324/207.25; 33/732; 74/512
(58) Field of Search ........... 324/206, 207.2–207.25; 73/DIG. 3; 74/500.5, 501.5 R, 505, 506, 512, 513, 514; 123/376; 33/708, 712, 732, DIG. 1, 1 N

(56) References Cited

U.S. PATENT DOCUMENTS

| | | | |
|---|---|---|---|
| 4,490,674 A | * 12/1984 | Ito | |
| 4,570,118 A | * 2/1986 | Tomczak et al. | 324/207.22 X |
| 4,771,847 A | * 9/1988 | Michell | 123/376 X |
| 5,067,365 A | * 11/1991 | Laver | 74/513 X |
| 5,426,995 A | * 6/1995 | Maennle | 74/506 |
| 5,512,820 A | * 4/1996 | Alfors | 324/207.25 X |
| 6,056,218 A | * 5/2000 | Nanbu | 33/708 X |

FOREIGN PATENT DOCUMENTS

| | | | |
|---|---|---|---|
| DE | 37 30 926 A1 | | 3/1989 |
| DE | 195 06 938 | * | 8/1996 |
| EP | 597529 | * | 5/1994 |
| GB | 2217459 | * | 10/1989 |

OTHER PUBLICATIONS

Zabler et al: : Neue Alternative Loesungen Fuer Drehzahlsensoren in Kraftfahrzeug . . . , VDI–Bericht NR. 509, 1984, pp. 263–268.

* cited by examiner

Primary Examiner—Gerard R. Strecker
(74) Attorney, Agent, or Firm—Michael J. Striker

(57) ABSTRACT

A travel sensor for detecting an absolute value of a travel of a mechanical component or a travel change, the travel sensor has a rotatable circular sensor element having a circumference, a detector, and a mechanical device arranged so that a longitudinal motion of the mechanical component is convertable with the mechanical device into a rotary motion of the sensor element, the mechanical device being formed as a Bowden cable which is acted upon by the longitudinal motion of the mechanical component to be detected and is retained on the circumference of the circular sensor element so as to be wound up onto and wound from the circular sensor element, the sensor element carrying a dipole permanent magnet whose field lines as a function of its rotary position intersect the detector in different directions, so that in operation an unambiguous angle signal is present at an output of the detector.

9 Claims, 2 Drawing Sheets

TRAVEL SENSOR FOR DETECTING TRAVEL VALUE OR TRAVEL CHANGE OF MECHANICAL COMPONENT

BACKGROUND OF THE INVENTION

The invention relates to a travel sensor.

In a travel sensor known from German Patent Disclosure DE OS 37 30 926, the motion of the piston of a cylinder, for instance in the control device for a rear-wheel drive of a motor vehicle, is detected. To that end, an extension of the piston comprising magnetizable material protrudes into a cylinder tube with coils with external windings, and by its motion leads to an inductive variation of the coil thread, which can be evaluated by measuring inventions.

SUMMARY OF THE INVENTION

A travel sensor described above is advantageous, because contactless travel measurement that is easily adaptable to different travel lengths can be realized in a simple way. Even to detect relatively long travel distances covered by a mechanical component, such as the brake pedal of a motor vehicle, a travel sensor with minimal installation space can be constructed by converting the longitudinal motion into a rotary motion.

Advantageously, the conversion of the longitudinal motion into a rotary motion can be done with a Bowden cable. This Bowden cable can easily be wound onto and unwound from the circumference of a circular rotatable sensor element that has a permanent magnet mounted on it. Any required restoring force for the Bowden cable is generated for instance with a spring, preferably a spiral spring, secured to the end of the Bowden cable and to the housing of the travel sensor.

In an advantageous embodiment, a revolution of the sensor module by an angle of greater than 180° can also be detected, by providing that a second rotatable sensor element is present, driven with suitable speed reduction by the first sensor element. Each time the rotary angle of 180° for the first sensor element is exceeded, an evaluatable signal is thus detectable in a simple way, and a travel measurement can be attained over a wide travel range with high resolution by measuring a rotary angle.

A simple realization of this travel measurement described above is effected in such a way that the first sensor element has a set of internal teeth, with which a set of external teeth of the second sensor element meshes, and that the ratio of the numbers of teeth of the two sets of teeth, or the diameters of the two sensor elements, is predetermined by the travel, to be detected, of the mechanical component.

For the contactless travel measurement with the detector according to the invention, reliable, redundant detection and evaluation even of the absolute value of the travel can advantageously be performed by generating an analog or digitized evaluation signal. To that end, existing techniques for contactless, high-resolution rotary angle detection can also be used.

For example, VDI-Bericht [Reports of the German Association of Engineers] No. 509 (VDI-Verlag 1984), pages 263–268, in the article entitled "Neue, alternative Lösungen für Drehzahlsensoren im Kraftfahrzeug auf magnetoresistiver Basis" [Novel alternative solutions for magnetoresistive rpm sensors in the motor vehicle] describes how an especially simple and invulnerable rotary angle detection of rotating shafts or gear wheels can be performed, using magnetic probes as the sensor elements. This is possible because the field line direction of a permanent magnet located in the sensor can be varied and detected by means of a rotary motion. In the aforementioned previously known document, both magnetoresistive thin-film sensors and Hall elements are described as detectors, with which the scanning of a change in a magnetic field can be performed.

BRIEF DESCRIPTION OF THE DRAWING

Exemplary embodiments of the travel sensor of the invention will be explained in conjunction with the drawing. Shown are.

DESCRIPTION OF THE PREFERRED EMBODIMENTS

Figure 1:
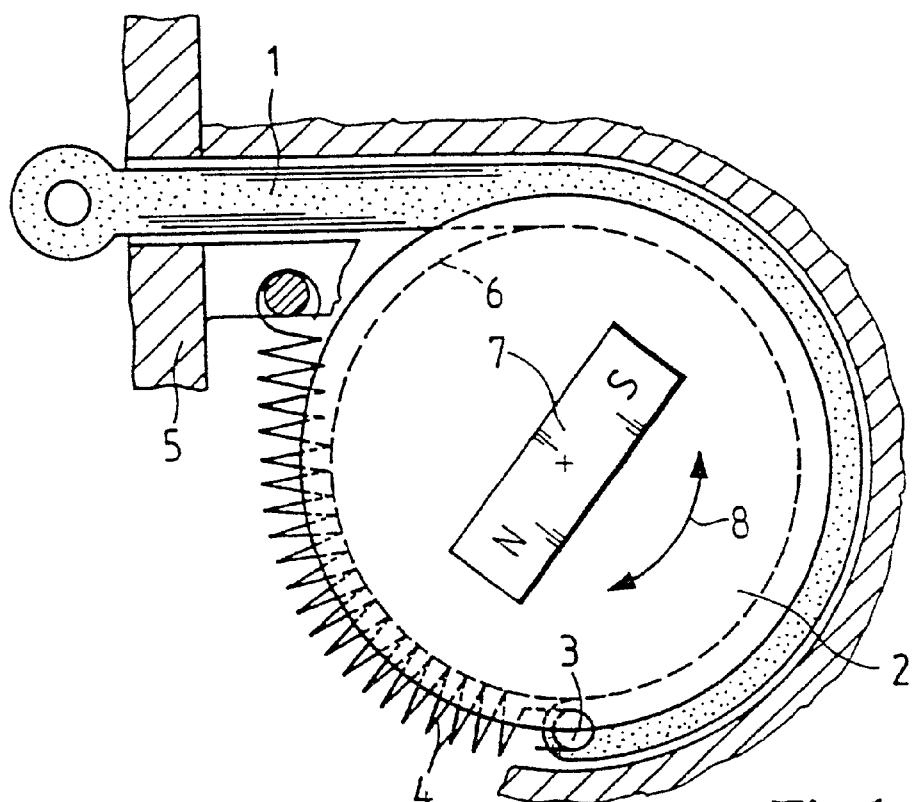
FIG. 1, a schematic view of a travel sensor with rotary angle detection via a magnet.

In the exemplary embodiment of a travel sensor according to FIG. 1, a Bowden cable 1 is coupled with a mechanical component not shown here, such as a brake pedal of a motor vehicle. A rotary sensor element 2 here is a further component of the mechanical device for converting a longitudinal motion of the Bowden cable 1 into a rotary motion and is constructed in the manner of a drum so that the Bowden cable 1 can be wound onto it and unwound from it. One end 3 of the Bowden cable 1 is secured via a spiral spring 4 to the housing 5 of the travel sensor, in which the sensor element 2 is also rotatably retained. The Bowden cable 1 and the spiral spring 4 rest in a groove 6 on the circumference of the sensor element 2.

The sensor element 2 carries a permanent magnet 7, which varies its position and thus the direction of its field lines as a result of a rotation (arrow 8) of the sensor element 2. From the illustration in FIG. 2, the position of the permanent magnet 7 relative to a detector having angle measuring elements 9 and 10 can be seen. These angle measuring elements 9 and 10 can preferably be so-called AMRs (for anisotropic magnetoresistive angle measuring elements), GMRs (for giant magnetoresistive angle measuring elements), or Hall elements.

In the exemplary embodiment of FIG. 1, the brake pedal of a motor vehicle has been depressed down to a stop, and the Bowden cable 1 has been wound up as far as possible. If the brake pedal is released, then the sensor element 2 rotates counterclockwise, and in the process the spiral spring 4 is tensed. The permanent magnet 7 rotates along with it, and its field lines intersect the detector, secured statically to the housing 5, in an altered way, so that the angular motion can be detected, and an analog or optionally digitized angle signal is available at the output of the detector.

Figure 2:
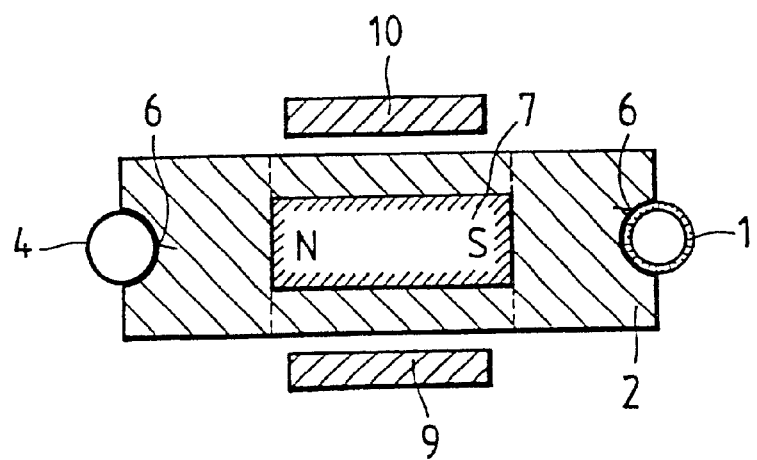
FIG. 2, a section through the rotatable sensor element of FIG. 1.

The exemplary embodiment of FIGS. 1 and 2 thus allows rotary angle detection up to 180° but the choice of a suitable diameter for the rotatable sensor element 2, an adaptation to longer travel lengths is also possible.

Figure 3:
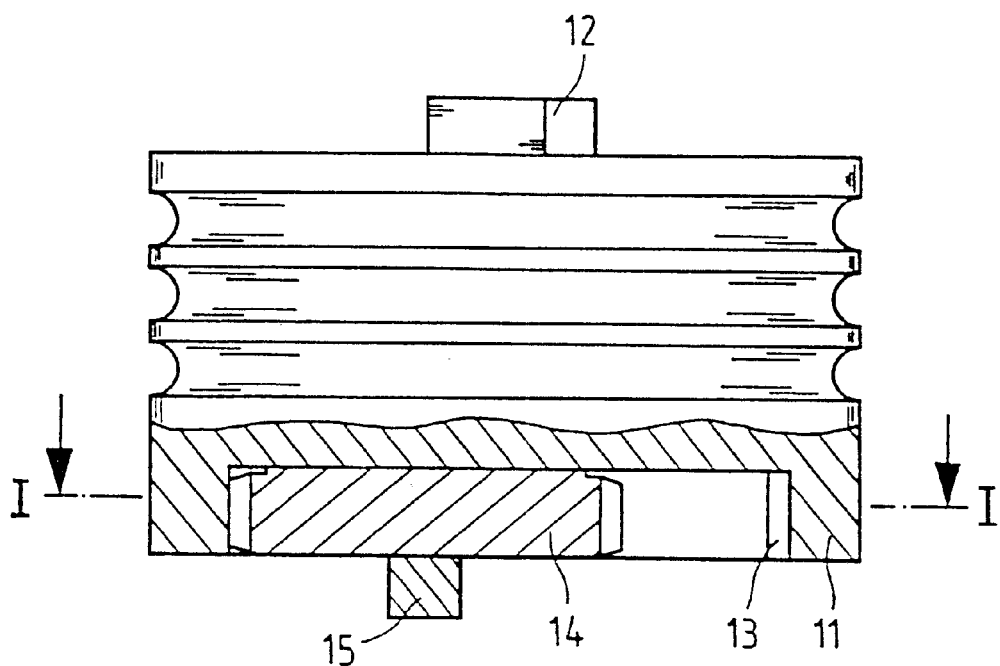
FIG. 3, a view of a second exemplary embodiment of a travel sensor for a multiple revolution of the sensor element.
Figure 4:
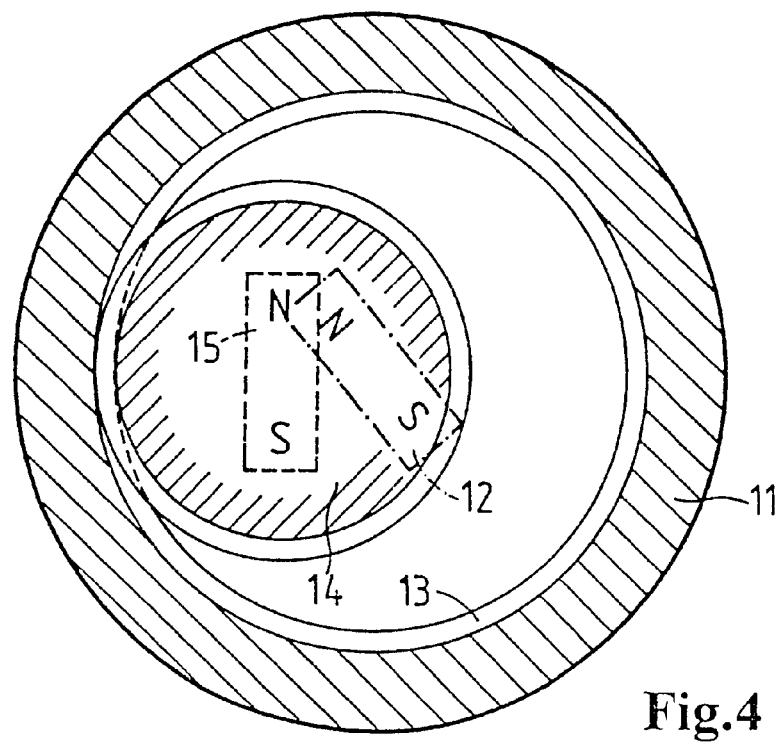
FIG. 4, a schematic view of the sensor element taken along the line I–II of FIG. 3, with a second sensor element located on the inside.

FIG. 3 shows a view of a second exemplary embodiment, in which a drum-like sensor element 11 can hold multiple laps of the Bowden cable 1 in grooves 6; thus the rotary angle detection range here is greater than 180°. This sensor element 11, as in the exemplary embodiment of FIG. 1, has a permanent magnet 12 at the top, which rotates synchronously with the revolution of the sensor element 11. The sensor element 11 has a set of internal teeth 13, with which a gear wheel 14, as a second sensor element of smaller diameter, meshes (see also FIG. 4). A permanent magnet 15 that also rotates with it is secured to this smaller second sensor element 14.

By means of a suitable choice of the inside diameter of the internal teeth 13 and of the outside diameter of the second sensor element 14, or by a suitable choice of the ratio of the numbers of teeth, rotary angles that exceed 180° can thus also be detected. This exemplary embodiment thus has two detectors that have been described in conjunction with FIG. 1. Thus with these detectors, beginning with an actuation of the Bowden cable 1, both the absolute angular position and the instances of exceeding the angle of 180° at the sensor elements 2 and 11, and thus the absolute values can be detected for the travels of the Bowden cable 1 that are to be measured.

What is claimed is:

1. A travel sensor for detecting an absolute value of a travel of a mechanical component or a travel change, the travel sensor comprising a rotatable circular sensor element having a circumference; a magnetic field detector positioned proximate said sensor element; and a mechanical device arranged so that a longitudinal motion of the mechanical component is convertable with said mechanical device into a rotary motion of said sensor element, said mechanical device being formed as a Bowden cable which is acted upon by the longitudinal motion of the mechanical component to be detected and is retained on said circumference of said circular sensor element so as to be wound up onto and wound from said circular sensor element, said sensor element carrying a dipole permanent magnet whose field lines as a function of its rotary position intersect said detector in different directions, so that in operation an unambiguous angle signal is present at an output of said detector.

2. A travel sensor as defined in claim 1; and further comprising a housing; and a spring by which an end of said Bowden cable located on said sensor element is secured to said housing.

3. A travel sensor as defined in claim 1; and further comprising a second rotatable sensor element driven by said first mentioned sensor element and detecting a revolution of said first mentioned sensor element at an angle of greater than 180°, said second sensor element also carrying a dipole permanent magnet.

4. A travel sensor as defined in claim 3, wherein said first sensor element has a set of internal teeth, said second sensor element having a set of external teeth matching with said internal teeth, said internal teeth and external teeth being formed so that a ratio of numbers of teeth of said internal teeth and said external teeth is predetermined by a travel to be detected of the mechanical component and by diameters of said sensor elements.

5. A travel sensor as defined in claim 1, wherein said detector is at least one anisotropic magneto resistive angle measuring element.

6. A travel sensor as defined in claim 1, wherein said detector is at least one giant magneto resistive angle measuring element.

7. A travel sensor as defined in claim 1, wherein said detector is at least one Hall angle measuring element.

8. A travel sensor as defined in claim 3, wherein said detector has angle measuring elements each disposed at both sides of said rotatable sensor elements.

9. A travel sensor as defined in claim 1, wherein said mechanical device is connectable with the mechanical component formed as a break pedal in a motor vehicle.

\* \* \* \* \*